(12) United States Patent
Fukuda et al.

(10) Patent No.: US 6,673,876 B2
(45) Date of Patent: Jan. 6, 2004

(54) FLUORINATED CURABLE COMPOSITIONS

(75) Inventors: Kenichi Fukuda, Gunma-ken (JP); Mikio Shiono, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 106 days.

(21) Appl. No.: 10/077,989

(22) Filed: Feb. 20, 2002

(65) Prior Publication Data
US 2002/0156198 A1 Oct. 24, 2002

(30) Foreign Application Priority Data

Feb. 20, 2001 (JP) .......................... 2001-042696

(51) Int. Cl.$^7$ ........................... C08L 83/05; C08L 71/00
(52) U.S. Cl. ..................... 525/478; 525/479; 528/15; 528/28; 528/31; 528/32; 528/43
(58) Field of Search ................. 525/478, 479; 528/15, 28, 31, 32, 43

(56) References Cited

U.S. PATENT DOCUMENTS

| | | | |
|---|---|---|---|
| 6,040,400 A | | 3/2000 | Fukuda et al. |
| 6,127,504 A | * | 10/2000 | Fukuda et al. ............ 528/15 |
| 6,160,074 A | | 12/2000 | Matsuda et al. |
| 6,414,062 B1 | * | 7/2002 | Fukuda et al. ............ 524/267 |

FOREIGN PATENT DOCUMENTS

| | | |
|---|---|---|
| EP | 0 725 113 A1 | 8/1996 |
| EP | 0 967 251 A1 | 12/1999 |
| JP | 56-143241 | 11/1981 |
| JP | 63-33475 | 2/1988 |
| JP | 63-35655 | 2/1988 |
| JP | 11-116685 | 4/1999 |

* cited by examiner

*Primary Examiner*—D. R. Wilson
(74) *Attorney, Agent, or Firm*—Birch, Stewart, Kolasch & Birch, LLP

(57) ABSTRACT

A fluorinated curable composition in which a fluorinated organohydrogensiloxane as the curing agent is well compatible with a linear polyfluoro compound as the base yields a cured gel having good adhesion to substrates and improved chemical and solvent resistance.

3 Claims, No Drawings

FLUORINATED CURABLE COMPOSITIONS

This invention relates to fluorinated curable compositions which cure into gel products having adhesion and improved chemical and solvent resistance, and are suited for the potting, sealing and coating of electric and electronic parts.

BACKGROUND OF THE INVENTION

Cured gel products of silicone rubber have good electrically and thermally insulating properties, stable electric properties and flexibility. They are useful as potting and sealing materials for electric and electronic parts, and coating materials for protecting control circuit devices such as power transistors, ICs and capacitors from external, thermal and mechanical damages.

Typical silicone rubber composition examples forming such cured gel products are organopolysiloxane compositions of the addition curing type. The organopolysiloxane compositions of the addition curing type are known, for example, from JP-A 56-143241, 63-35655 and 63-33475 as comprising an organopolysiloxane having a vinyl group attached to a silicon atom and an organohydrogenpolysiloxane having a hydrogen atom attached to a silicon atom, wherein crosslinking reaction takes place in the presence of a platinum group catalyst to form a silicone gel.

However, silicon gels resulting from such organopolysiloxane compositions of the addition curing type are prone to degradation or swelling upon exposure to such chemicals as strong bases and strong acids or such solvents as toluene, alcohols and gasoline, often failing to maintain their performance.

As one solution to this problem, JP-A 11-116685 discloses a fluorochemical gel composition comprising a polyfluoro compound having two alkenyl groups and a divalent perfluoropolyether group in a molecule, an organohydrogenpolysiloxane having a hydrogen atom attached to a silicon atom, and a platinum group catalyst as well as a fluorochemical gel product resulting from curing thereof. This cured fluorochemical gel product exhibits better chemical and solvent resistance as desired than ordinary silicone gels, but is less adherent to substrates of electric and electronic parts.

Although the organohydrogenpolysiloxane is combined with the high molecular weight perfluoropolyether serving as the base in the above composition, the organohydrogenpolysiloxane is less compatible with the base, leaving problems of separation and unstable cure.

SUMMARY OF THE INVENTION

An object of the invention is to provide a fluorinated curable composition comprising compatible components which cures into a gel product having good substrate adhesion and improved chemical and solvent resistance.

It has been found that when a linear polyfluoro compound containing at least two alkenyl groups of the following general formula (1), a fluorinated organohydrogensiloxane of the following general formula (2) and a platinum group metal catalyst are blended in combination, these components are fully compatible with each other and the resulting fluorinated curable composition cures into a gel product having good substrate adhesion and improved chemical and solvent resistance.

Specifically, the invention provides a fluorinated curable composition comprising as essential components, (A) a linear polyfluoro compound of the following general formula (1):

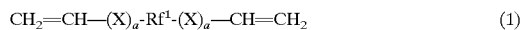

$$CH_2=CH-(X)_a-Rf^1-(X)_a-CH=CH_2 \qquad (1)$$

wherein X is independently —$CH_2$—, —$CH_2O$—, —$CH_2OCH_2$— or —Y—$NR^1$—CO— wherein Y is —$CH_2$— or a divalent group represented by

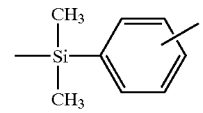

and $R^1$ is hydrogen or a substituted or unsubstituted monovalent hydrocarbon group, $Rf^1$ is a divalent perfluoropolyether group, and "a" is independently equal to 0 or 1, (B) a fluorinated organohydrogensiloxane of the following general formula (2):

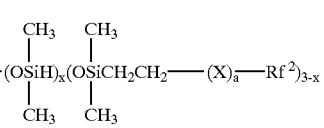

wherein X and "a" are as defined above, $Rf^2$ is a monovalent perfluoropolyether group, Z is a divalent hydrocarbon group, $Rf^3$ is a divalent perfluoroalkylene or perfluoropolyether group, w and x each are an integer of up to 3, w+x is from 2 to 5, y is 0 or 1, and a+y is at least 1, and (C) a catalytic amount of a platinum group metal catalyst.

DESCRIPTION OF THE PREFERRED EMBODIMENT

In the fluorinated curable composition of the invention, component (A) is a linear polyfluoro compound of the following general formula (1).

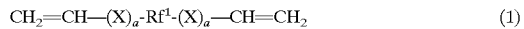

$$CH_2=CH-(X)_a-Rf^1-(X)_a-CH=CH_2 \qquad (1)$$

Herein X is independently —$CH_2$—, —$CH_2O$—, —$CH_2OCH_2$— or —Y—$NR^1$—CO— wherein Y is —$CH_2$— or a divalent group represented by

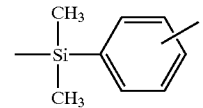

and $R^1$ is hydrogen or a substituted or unsubstituted monovalent hydrocarbon group. $Rf^1$ is a divalent perfluoropolyether group. Letter "a" is independently equal to 0 or 1.

In formula (1), $Rf^1$ is a divalent perfluoropolyether group, and preferably selected from groups of the following formulae:

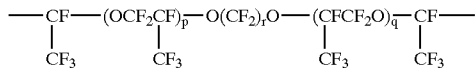

wherein p and q each are an integer of at least 1, p+q is from 50 to 200, and r is an integer of 2 to 6,

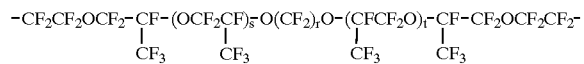

wherein r is an integer of 2 to 6, s is an integer inclusive of 0, t is an integer inclusive of 0, s+t is from 50 to 200, and

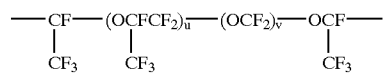

wherein u is an integer of 50 to 200 and v is an integer of 1 to 50.

Illustrative examples of $Rf^1$ are given below.

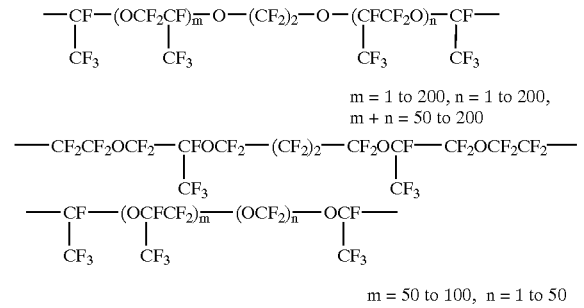

m = 1 to 200, n = 1 to 200,
m + n = 50 to 200 m = 50 to 100, n = 1 to 50

In formula (1), X is independently —$CH_2$—, —$CH_2O$—, —$CH_2OCH_2$— or —Y—$NR^1$—CO—. Herein Y is —$CH_2$— or a divalent group of the following formula.

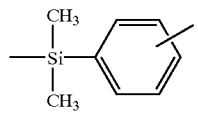

$R^1$ is hydrogen or a substituted or unsubstituted monovalent hydrocarbon group. The monovalent hydrocarbon groups preferably have 1 to 12 carbon atoms, more preferably 1 to 10 carbon atoms. Illustrative are unsubstituted monovalent hydrocarbon groups, for example, alkyl groups such as methyl, ethyl, propyl, butyl, hexyl, cyclohexyl and octyl, aryl groups such as phenyl and tolyl, and aralkyl groups such as benzyl and phenylethyl, and substituted monovalent hydrocarbon groups obtained by replacing some or all of the hydrogen atoms in the foregoing groups by halogen atoms such as fluorine.

The alkenyl groups in formula (1) are preferably vinyl, allyl and analogous groups having a —CH=$CH_2$ structure at the end. The alkenyl groups may be bonded to opposite ends of the backbone directly or via divalent linkage groups represented by X.

In formula (1), letter "a" is independently equal to 0 or 1.

It is preferred that the inventive composition have an appropriate flow so that the composition is useful in casting, potting, coating, impregnation and adhesion, and that its cured product have appropriate physical properties. From this standpoint, component (A) should preferably have a viscosity in the range of 5 to 100,000 mPa·s at 23° C. Depending on a particular application, component (A) having a most appropriate viscosity within the range is desirably used.

Component (B) is a fluorinated organohydrogensiloxane of the following general formula (2).

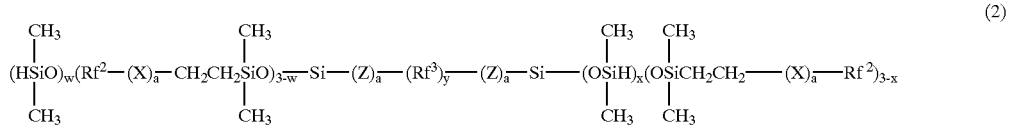

(2)

Herein X and "a" are as defined above, $Rf^2$ is a monovalent perfluoropolyether group, Z is a divalent hydrocarbon group, $Rf^3$ is a divalent perfluoroalkylene or perfluoropolyether group, w and x each are an integer of up to 3, w+x is from 2 to 5, y is 0 or 1, and a+y is at least 1.

The monovalent perfluoropolyether groups represented by $Rf^2$ are preferably those of the following formulae.

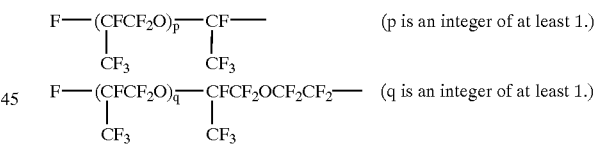

(p is an integer of at least 1.)

(q is an integer of at least 1.)

More illustrative examples of $Rf^2$ are given below.

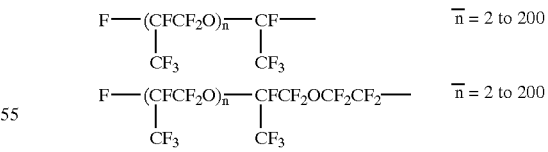

$\overline{n}$ = 2 to 200

$\overline{n}$ = 2 to 200

In formula (2), X and "a" are as defined in formula (1) while X and "a" in formula (1) may be identical with or different from X and "a" in formula (2), respectively.

The divalent hydrocarbon groups represented by Z are preferably those of 1 to 10 carbon atoms, especially 1 to 5 carbon atoms, including alkylene groups such as methylene, ethylene, propylene, methylethylene and tetramethylene, and arylene groups such as phenylene.

Preferred examples of the divalent perfluoroalkylene and perfluoropolyether groups represented by $Rf^3$ are given below.

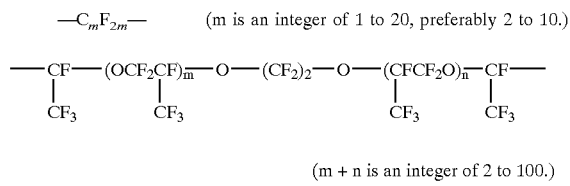

(m is an integer of 1 to 20, preferably 2 to 10.)

(m + n is an integer of 2 to 100.)

Subscripts w and x each are an integer of up to 3, satisfying $5 \geqq w+x \geqq 2$, and y is 0 or 1, satisfying $a+y>1$.

The fluorinated organohydrogensiloxane (B) serves as a crosslinker and chain extender for component (A), and should preferably have at least two hydrosilyl groups (i.e., Si—H groups) in a molecule. For compatibility and dispersion with component (A) and cured uniformity, component (B) should preferably have at least one $Rf^2$ linking group. The following compounds are exemplary of the fluorinated organohydrogensiloxane. These compounds may be used alone or in admixture of two or more.

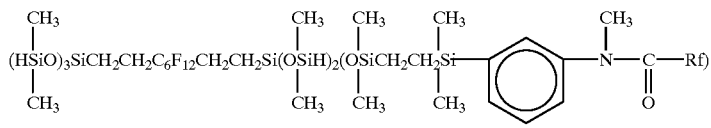

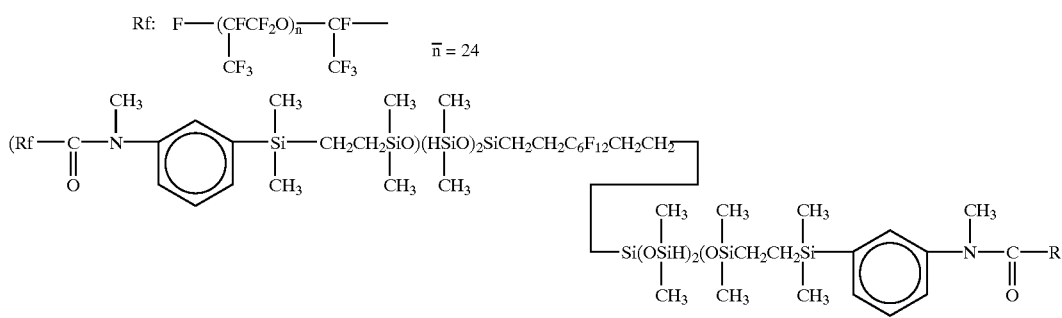

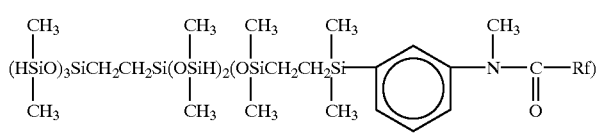

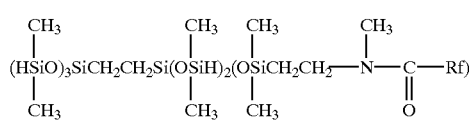

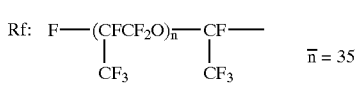

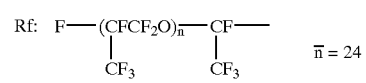

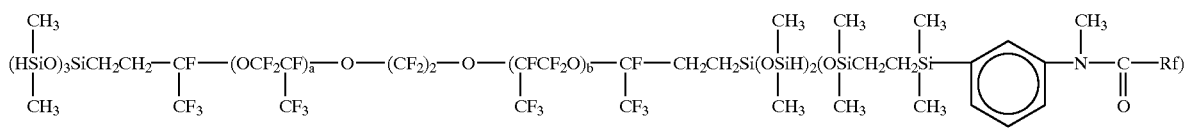

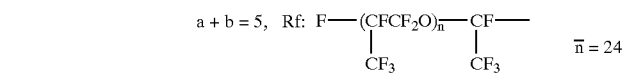

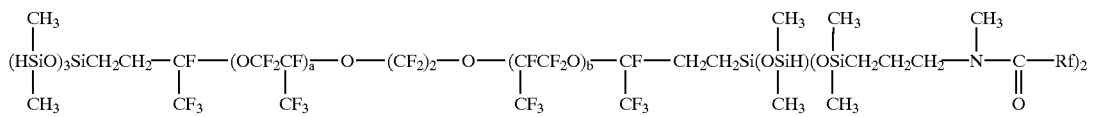

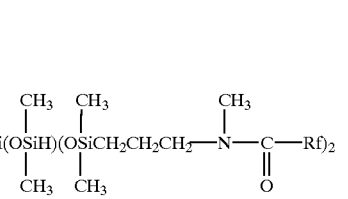

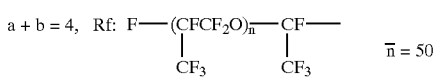

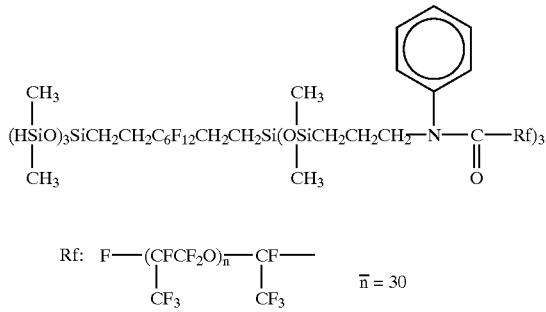

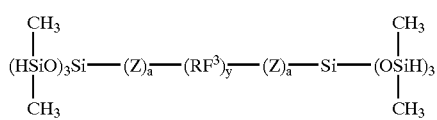

Component (B) is preferably used in such amounts that 0.2 to 2 mol, more preferably 0.5 to 1.3 mol of hydrosilyl groups (i.e., Si—H groups) are available per mol of aliphatic unsaturated groups (e.g., vinyl and allyl) in the entire composition. Amounts of component (B) giving less than 0.2 mol of Si—H groups may achieve an insufficient degree of crosslinking, failing to produce a cured gel. With excessive amounts of component (B) giving more than 2 mol of Si—H groups, curing can entail foaming.

Component (B) can be obtained by effecting addition reaction of an alkenyl group-containing fluorine compound of the following general formula (ii) to a polyfunctional SiH compound of the following general formula (i) in the presence of an addition reaction catalyst such as a platinum compound.

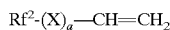

$Rf^2-(X)_a-CH=CH_2$ (ii)

Herein $Rf^3$, z, x, a and y are as defined above.

The amount of compound (ii) added to compound (i) is determined such that w and x in formula (2) fall in the above-defined range.

Component (C) is a platinum group metal catalyst for promoting addition reaction between aliphatic unsaturated group in component (A) and hydrosilyl groups in component (B). These catalysts are generally noble metal compounds which are expensive, and therefore, platinum compounds which are relatively easily available are often employed.

The platinum compounds include, for example, chloroplatinic acid, complexes of chloroplatinic acid with olefins such as ethylene, complexes of chloroplatinic acid with alcohols and vinylsiloxanes, and platinum on silica, alumina or carbon, though not limited thereto. Known examples of the platinum group compounds other than the platinum compound are rhodium, ruthenium, iridium and palladium compounds, for example, $RhCl(PPh_3)_3$, $RhCl(CO)(PPh_3)_2$, $Ru_3(CO)_{12}$, $IrCl(CO)(PPh_3)_2$, and $Pd(PPh_3)_4$.

The catalyst is used in a catalytic amount. Usually, the preferred amount of the catalyst is about 0.1 to 100 parts by weight of platinum group metal per million parts by weight of components (A) and (B) combined.

In addition to the above-described components (A) to (C), the composition of the invention may further contain various additives which are per se known. Such optional components include regulators for hydrosilylation catalysts, for example, acetylene alcohols such as 1-ethynyl-1-hydroxycyclohexane, 3-methyl-1-butyn-3-ol, 3,5-dimethyl-1-hexyn-3-ol, 3-methyl-1-penten-3-ol, and phenylbutynol, 3-methyl-3-penten-1-yne, 3,5-dimethyl-3-hexen-1-yne, etc., polymethylvinylsiloxane cyclic compounds, and organic phosphorus compounds. These regulators are effective for maintaining curing reactivity and storage stability appropriate. Other optional components include inorganic fillers, for example, fumed silica, silica aerogel, precipitated silica, ground silica, diatomaceous earth, iron oxide, zinc oxide, titanium oxide, calcium carbonate, magnesium carbonate, zinc carbonate, and carbon black. By adding such inorganic fillers to the inventive composition, the hardness and mechanical strength of cured gel can be adjusted. There may be added hollow inorganic fillers, hollow organic fillers and rubbery spherical fillers as well. Also, by adding a well compatible perfluoropolyether oil free of reactive functional groups, the viscosity of the composition or the hardness of a cured product can be adjusted. The amounts of these optional components added are arbitrary insofar as they do not compromise the physical properties of cured gel.

Moreover, a linear polyfluoro compound of the following general formula (3):

$$Rf^2-(X)_a-CH=CH_2 \qquad (3)$$

wherein X, "a" and $Rf^2$ are as defined above, may be used in combination with component (A). The use of the compound of formula (3) is effective to produce a cured gel having better properties.

The alkenyl groups in formula (3) are preferably vinyl, allyl and analogous groups having a —CH=CH$_2$ structure at the end, as in component (A). The alkenyl groups may be bonded to the backbone directly or via divalent linkage groups represented by X.

The fluorinated curable composition comprising the essential and optional components mentioned above is cured into a gel product (or cured gel) having improved solvent resistance and chemical resistance.

By the term "cured gel" as used herein it is meant that the cured product has a three-dimensional structure in part and undergoes deformation and flow under stress. As an approximate measure, the cured gel has a hardness of up to "0" as measured by a JIS rubber hardness meter or a penetration of 1 to 200 as measured according to ASTM D-1403 (¼ cone).

The cured gel is generally obtained by well-known methods, for example, by pouring the inventive composition of the addition curing type into a suitable mold and causing the composition to cure therein. Alternatively, the inventive composition is coated onto a suitable substrate and cured thereon. Curing is effected simply by heating at a temperature of about 60 to 150° C. for about 30 to 180 minutes.

There have been described fluorinated curable compositions in which the fluorinated organohydrogensiloxane as the curing agent is well compatible with the base component and which yield cured gel products having good adhesion to substrates and improved chemical and solvent resistance. The compositions are thus suited for the potting and sealing of electric and electronic parts and as protective coating materials for control circuit elements such as power transistors, ICs and capacitors.

EXAMPLE

Examples of the invention are given below by way of illustration and not by way of limitation. Parts are by weight.

Example 1

To 60 parts of a polymer (viscosity 10,000 cp) of the following formula (4) and 40 parts of a polymer (viscosity 1,000 cp) of the following formula (5) were added 20 parts of a compound of the following formula (6), 0.15 part of a 50% toluene solution of ethynylcyclohexanol, and 0.015 part of an ethanol solution of a chloroplatinic acid-vinylsiloxane complex (platinum concentration 3.0% by weight). Mixing these components yielded a fluorinated curable composition. This composition appeared clear, and remained clear after holding at 25° C. for 24 hours.

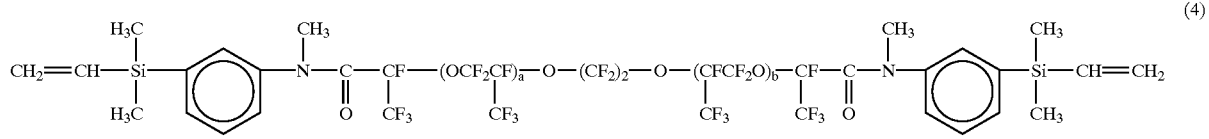

(4)

$\overline{a+b} = 100$

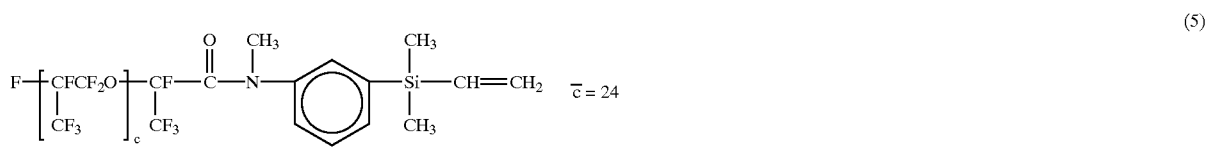

(5)

$\overline{c} = 24$

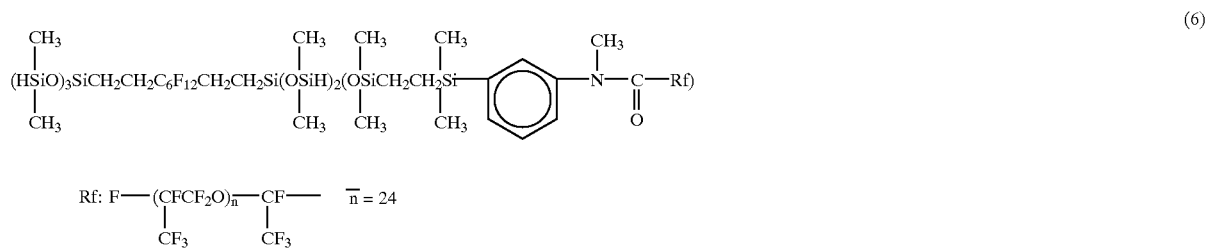

(6)

The composition was cured by heating at 150° C. for one hour, obtaining a clear cured gel having a penetration of 70 as measured according to ASTM D-1403 (¼ cone).

Example 2

A fluorinated curable composition was prepared as in Example 1 except that 70 parts of a polymer of the following formula (7) was used instead of the polymer of formula (4), 30 parts of a compound of the following formula (8) used instead of the polymer of formula (5), and 30 parts of a compound of the following formula (9) used instead of the compound of formula (6). This composition appeared clear, and remained clear after holding at 25° C. for 24 hours.

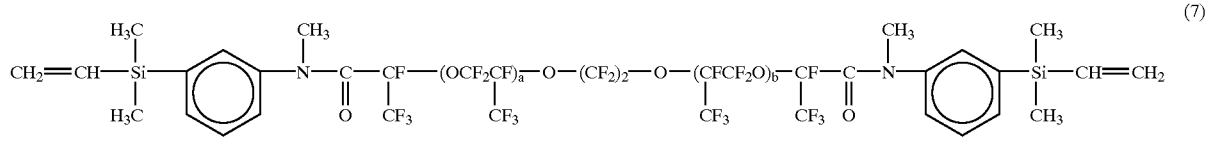

(7)

$\overline{a+b} = 150$

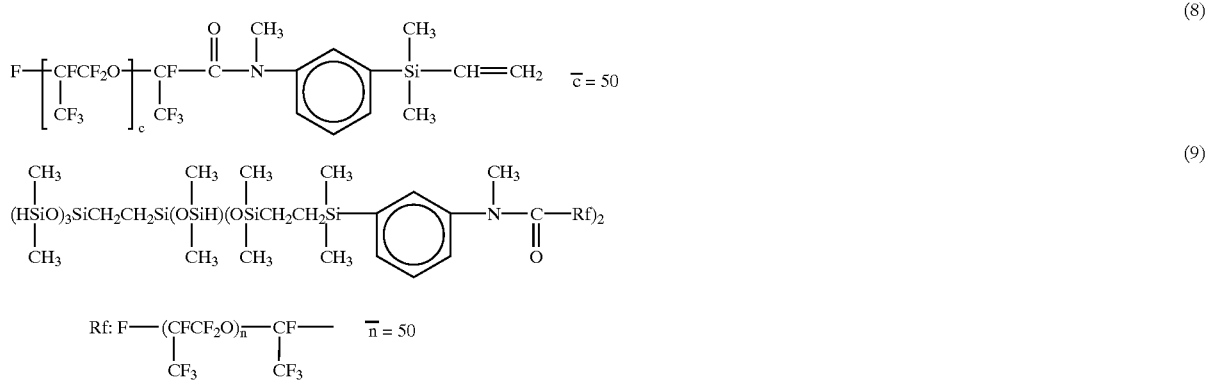

(8)

$\overline{c} = 50$ (9)

$\overline{n} = 50$

The composition was similarly cured, obtaining a clear cured gel having a penetration of 60 as measured according to ASTM D-1403 (¼ cone).

Example 3

A fluorinated curable composition was prepared as in Example 1 except that 18 parts of a compound of the following formula (10) was used instead of the polymer of formula (6). This composition appeared clear, and remained clear after holding at 25° C. for 24 hours.

Reference Example 1

A 1-liter four-necked flask equipped with a stirrer, thermometer, condenser and dropping funnel was charged with 370 g of a compound of the following formula (a) and 200 g of toluene and heated at 80° C. Thereafter, 0.1 g of a toluene solution of chloroplatinic acid-vinylsiloxane complex (platinum concentration 0.5% by weight) was added, and 700 g of a compound of the following formula (b) added dropwise from the dropping funnel.

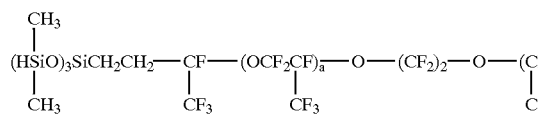

(10)

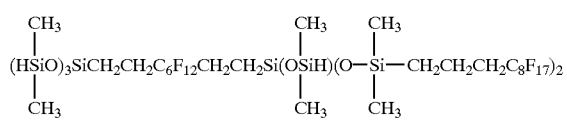

The composition was similarly cured, obtaining a clear cured gel having a penetration of 65 as measured according to ASTM D-1403 (¼ cone).

Comparative Example 1

A composition was prepared as in Example 1 except that 10 parts of a compound of the following formula (11) was used instead of the compound of formula (6). This composition appeared white turbid. It separated into two layers after holding at 25*C for 24 hours.

(11)

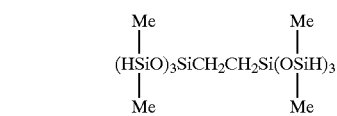

The composition was similarly cured, obtaining a white turbid, non-uniformly cured gel.

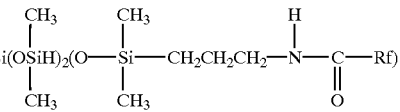

(a)

$C_8F_{17}CH_2CH=CH_2$ (b)

After the completion of dropwise addition, the reaction solution was aged at 80° C. for one hour. After the consumption of compound (b) was confirmed by gas chromatography, the reaction solution was cooled down.

Thereafter, 10 g of activated carbon was added to the reaction solution, which was stirred for one hour and filtered. The filtrate was stripped of the solvent under conditions of 120° C. and 3 Torr, yielding 990 g of a colorless clear liquid having a viscosity of 28 cs, a specific gravity of 1.327 and a refractive index of 1.364.

On analysis by $^1$H-NMR, IR and elemental analysis, this liquid was identified to be a compound having an average structure of the following formula (c).

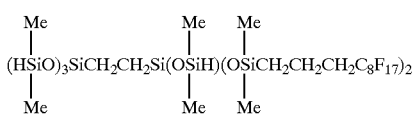
(c)

¹H-NMR δ 0.09 (S, C—Si—CH₃: 12H) δ 0.16 (s, H—Si—CH₃: 24H) δ 0.6–1.3 (m, Si—CH₂—: 8H) δ 1.5–2.3 (m, Si—CH₂—CH₂—CH₂—: 8H) δ 4.72 (s, Si—H: 4H)

IR 2130 cm⁻¹ $\nu_{Si-H}$

Elemental Analysis

|  | C | H | O | Si | F |
|---|---|---|---|---|---|
| Found (%) | 29.4 | 3.8 | 6.7 | 15.6 | 44.5 |
| Calcd. (%) | 29.7 | 3.9 | 6.6 | 15.4 | 44.4 |

Reference Example 2

A 1-liter four-necked flask equipped with a stirrer, thermometer, condenser and dropping funnel was charged with 115 g of a compound of formula (a) and 100 g of bistrifluoromethylbenzene and heated at 80° C. Thereafter, 0.03 g of a toluene solution of chloroplatinic acid-vinylsiloxane complex (platinum concentration 0.5% by weight) was added, and 1850 g of a compound of the following formula (d) added dropwise from the dropping funnel.

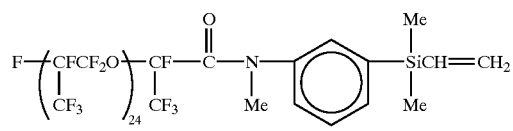
(d)

After the completion of dropwise addition, the reaction solution was aged at 80° C. for one hour and then cooled down.

Thereafter, 10 g of activated carbon was added to the reaction solution, which was stirred for one hour and filtered. The filtrate was stripped of the solvent under conditions of 120° C. and 3 Torr, yielding 1050 g of a colorless clear liquid having a viscosity of 2520 cs, a specific gravity of 1.709 and a refractive index of 1.333.

On analysis by ¹H-NMR, IR and elemental analysis, this liquid was identified to be a compound having an average structure of the following formula (e).

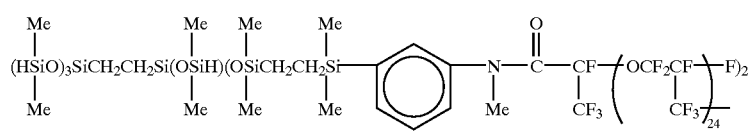
(e)

¹H-NMR δ 0.09 (s, C—Si—CH₃: 6H) δ 0.16 (s, H—Si—CH₃: 30H) δ 0.31 (s, arom. Si—CH₂—: 6H) δ 0.6–1.3 (m, Si—CH₃—: 8H) δ 3.23 (s, N—CH₃: 3H) δ 4.72 (s, Si—H: 5H) δ 7.2–7.7 (m, arom.: 4H)

IR 2130 cm⁻¹ $\nu_{Si-H}$

Elemental Analysis

|  | C | H | O | Si | F | N |
|---|---|---|---|---|---|---|
| Found (%) | 24.9 | 1.4 | 10.3 | 5.1 | 58.0 | 0.3 |
| Calcd. (%) | 24.7 | 1.3 | 10.2 | 5.2 | 58.3 | 0.3 |

Japanese Patent Application No. 2001-042696 is incorporated herein by reference.

Reasonable modifications and variations are possible from the foregoing disclosure without departing from either the spirit or scope of the present invention as defined by the claims.

What is claimed is:

1. A fluorinated curable composition comprising as essential components, (A) a linear polyfluoro compound of the following general formula (1):

$$CH_2=CH—(X)_a-Rf^1-(X)_a—CH=CH_2 \quad (1)$$

wherein X is independently —CH₂—, —CH₂O—, —CH₂OCH₂— or —Y—NR¹—CO—
wherein Y is —CH₂— or a divalent group represented by

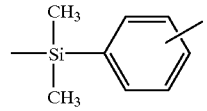

and R¹ is hydrogen or a substituted or unsubstituted monovalent hydrocarbon group, Rf¹ is a divalent perfluoropolyether group, and "a" is independently equal to 0 or 1, (B) a fluorinated organohydrogensiloxane of the following general formula (2):

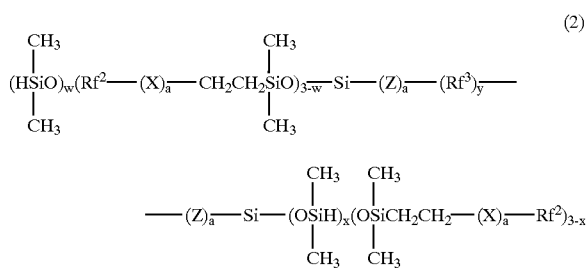
(2)

wherein X and "a" are as defined above, Rf² is a monovalent perfluoropolyether group, Z is a divalent hydrocarbon group, Rf³ is a divalent perfluoroalkylene or perfluoropolyether group, w and x each are an integer of up to 3, w+x is from 2 to 5, y is 0 or 1, and a+y is at least 1, and (C) a catalytic amount of a platinum group metal catalyst.

2. The composition of claim 1 wherein Rf¹ in formula (1) is selected from groups of the following formulae:

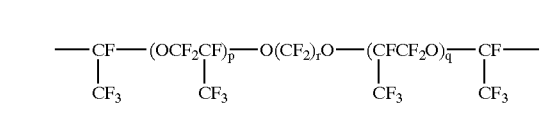

wherein p and q each are an integer of at least 1, p+q is from 50 to 200, and r is an integer of 2 to 6,

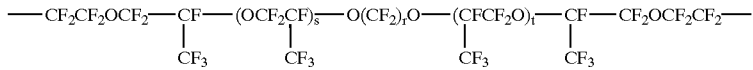
wherein r is an integer of 2 to 6, s is an integer inclusive of 0, t is an integer inclusive of 0, s+t is from 50 to 200, and
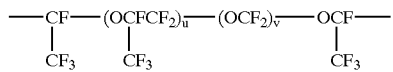
wherein u is an integer of 50 to 200 and v is an integer of 1 to 50.
3. The composition of claim 1 which cures into a gel product having a penetration of 1 to 200 as measured according to ASTM D-1403.
* * * * *